United States Patent [19]

Lupke

[11] Patent Number: 4,731,138

[45] Date of Patent: Mar. 15, 1988

[54] APPARATUS FOR PRODUCING DOUBLE-WALLED CORRUGATED PIPES

[76] Inventor: Manfred A. A. Lupke, 10 McLeary Court, Concord, Ontario, L4K 2Z3, Canada

[21] Appl. No.: 41,538

[22] Filed: Apr. 23, 1987

[30] Foreign Application Priority Data

Jun. 4, 1986 [CA] Canada ................................. 510772

[51] Int. Cl.$^4$ ........................................... B65H 81/00
[52] U.S. Cl. .................................... 156/429; 156/195; 156/210; 156/244.15; 156/285; 156/498; 156/500; 264/508
[58] Field of Search ............... 156/195, 210, 285, 205, 156/473, 446, 428, 429, 425, 498, 500

[56] References Cited

U.S. PATENT DOCUMENTS 3,816,204 6/1974 Nagayoshi ..................... 156/210 X Primary Examiner—David Simmons

[57] ABSTRACT

An apparatus for producing helically wound double-walled fused thermoplastic pipes, corrugated outside and smooth inside. The apparatus includes extruder means forming two bands of a thermoplastic material, a former shaping the corrugated configuration of and helically winding the first extruded band, a cooled element pressing the second band to the inside of the corrugations and having passages communicating with the second band and with a vacuum means.

1 Claim, 2 Drawing Figures

APPARATUS FOR PRODUCING DOUBLE-WALLED CORRUGATED PIPES

BACKGROUND OF THE INVENTION

This invention relates to apparatus for producing helically wound double-walled thermoplastic pipes having a corrugated outer wall and a smooth inner wall, both the walls being fused together.

Known such apparatus (for example, Canadian patent No. 1,194,662 of the present inventor and U.S. Pat. No. 4,575,400 of Ueda et al.) comprise the following components:

extruder means communicating respectively with first and second dies having extrusion orifices for extruding accordingly the first and second bands of a thermoplastic material for forming appropriately the outer and inner walls of the produced double-walled pipe;

a former located between said dies, downstream of the first die and upstream of the second die, their extrusion orifices being situated substantially along the former, the same having a lateral surface adapted to receive the first extruded band, to shape the corrugated configuration of the latter and to helically wind the same into the outer corrugated tube of the produced pipe, the inside of said outer tube receiving the second band helically wound into the inner smooth tube of the pipe;

an elongate tubing mounted inside the former and connecting the second die with its extruder means;

a cooled pressing element conforming to the inner wall and engaging the second band as it emerges from the second die and pressing the same to the outer wall to fuse them together.

The main difference between the known apparatus lies in the structure of their formers. In the first patent, the former is represented by a mandrel having an endless helical lateral surface. In the second patent, the former is represented by a plurality of rotating rollers arranged in a circular array.

The known devices have the followiong drawbacks:

fusing still unstable and soft plastic strip of the inner tube to the already formed outer tube wherein the inner tube turns from a soft to a rigid stage;

retraction of the band from the pressing element;

nonuniform change of the internal pressure of the strip.

These drawbacks lead to imperfections of the inner tube, such as shrink marks (depressions of its surface) in the spots of the retractions, warpage (caused by said change) and wrinkles having appearance of a wave.

SUMMARY OF THE INVENTION

The objective of the present invention is to eliminate the above drawbacks of the known apparatus. For this, said pressing element is provided with passages communicating with the second band and with a vacuum means. Due to this, the extruded band of the inner wall does not retract from the pressing element until it stabilizes and has uniform change of the internal pressure. This ensures the smoothness of the inner wall of the manufactured pipe.

A more complete appreciation of the present invention and the distinguishing characteristics, objectives and attendant advantages thereof set out herein are more apparent and obvious to one ordinary skilled in the art from the following detailed description, drawings and appended claims.

DESCRIPTION OF THE PREFERRED EMBODIMENT

Figure 1:
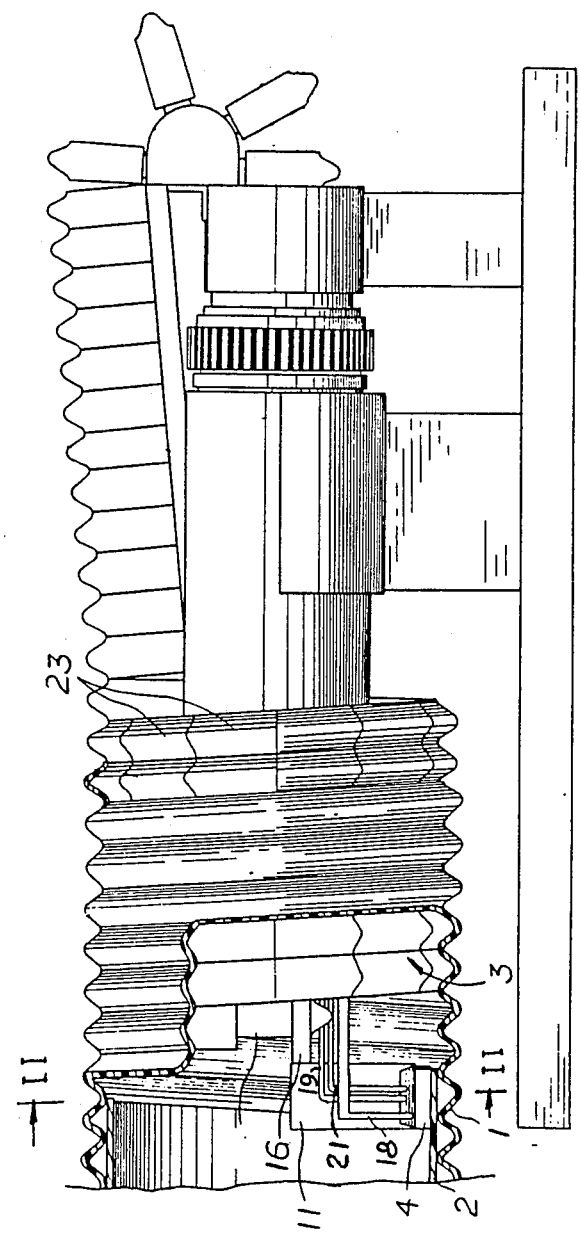
FIG. 1 is a side view, partially broken away, showing the apparatus of the present invention.
Figure 2:
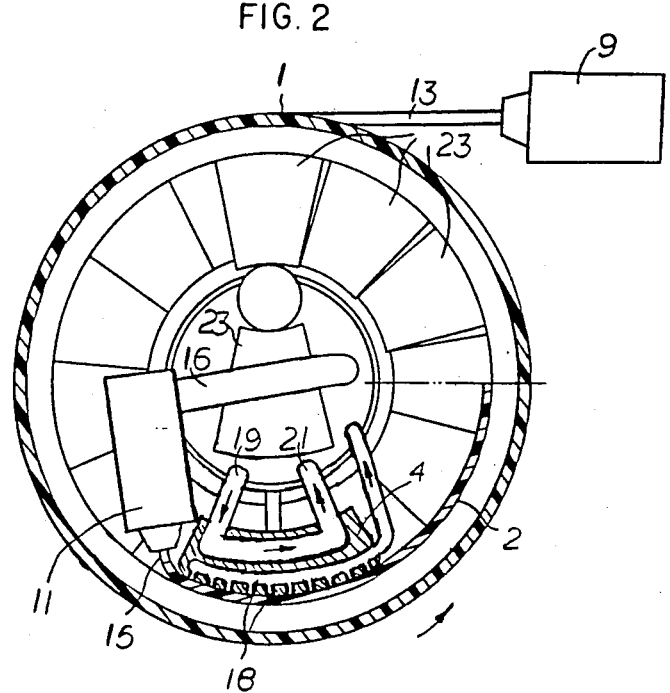
FIG. 2 is a section along line II—II of FIG. 1.

Referring now to the drawings, the apparatus of the present invention basically corresponds to that described in my above Canadian patent and is designed to produce helically wound and fused double-walled thermoplastic pipes having a corrugated outer wall 1 and a smooth inner wall 2.

The apparatus comprises extruder means (not shown), a former 3 and a cooled pressing element 4.

The extruder means communicates respectively with the first die 9 located upstream of the former 3 and with the second die 11 located downstream of the latter. The dies have extrusion orifices for extruding accordingly the first (13) and second (15) bands of a thermoplastic material forming appropriately the outer and inner walls 1 and 2.

The former 3 has a lateral surface adapted to receive the first extruded band 13, to shape the corrugated configuration of the latter and to helically wind the same into the outer corrugated tube of the formed double-walled pipe. The outer tube receives the second band 15 inside onto the lateral surface of the wall 1.

The second die 11 communicates with its extruder by means of an elongate tubing 16 mounted inside the former 3, along which said extrusion orifices are situated.

The cooled pressing element 4 conforms to the inner wall 2, engages the second band 15 as it emerges from the second die 11 and presses the same to the outer wall 1 to fuse them together. To keep the band 15 conforming to the lateral surface of the element 4, the same has passages 18 communicating with the inner wall 2 and with a vacuum means (not shown). Cooling of the element 4 is achieved by passing a coolant through it from communication lines 19 and 21.

The illustrated former 3 is described in detail in my U.S. Pat. No. 4,521,270 and is composed of series of moldblocks 23 travelling helically and constituting thus an axially advancing and rotating forming surface. At the downstream end of the former, the blocks are retracted radially, then are inverted and driven upstream inside the former 3. At the upstream end of the latter, the blocks are inverted again and fed to form said helical surface.

It is clearly understood that a person skilled in the art could apply the same structure with different options. For example, instead of the above former corresponding to my said U.S. patent, another former, corresponding to said U.S. Pat. No. 4,575,400, can be used.

In operation, the die 9 produces the band 13 of a thermoplastic material that is fed onto the upstream end of the former 3 and is formed into a corrugated configuration matching that of the lateral surface of the former and is helically wound to form the corrugated outer wall 1. The die 11 extrudes the band 15 passed between the element 4 and the outer wall 1. The band 15 is wound onto the inside of the already formed corrugated wall as the latter rotates and advances axially. This produces an inner smooth tube fused to the inside of the corrugations. The vacuum maintained between the band 15 and element 4 does not allow the band to retract from the element until the band is set.

While there has been described and pointed out the fundamental novel feature of the invention as applied to the preferred embodiment, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. An apparatus for producing helically wound double-walled thermoplastic pipes having a corrugated outer wall and a smooth inner wall, both the walls being fused together, the apparatus comprising:

extruder means communicating respectively with first and second dies having extrusion orifices for extruding accordingly the first and second bands of a thermoplastic material for forming appropriately the outer and inner walls of the produced double-walled pipe;

a former located between said dies, downstream of the first die and upstream of the second die, their extrusion orifices being situated substantially along the former, the same having a lateral surface adapted to receive the first extruded band, to shape the corrugated configuration of the latter and to helically wind the same into the outer corrugated tube of the produced pipe, the inside of said outer tube receiving the second band helically wound into the inner smooth tube of the pipe;

an elongate tubing mounted inside the former and connecting the second die with its extruder means;

a cooled pressing element conforming to the inner wall and engaging the second band as it emerges from the second die and pressing the same to the outer wall to fuse them together;

the improvement, wherein said pressing element has passages communicating with the second band and with a vacuum means.

* * * * *